(12) United States Patent
Oh et al.

(10) Patent No.: US 6,748,194 B2
(45) Date of Patent: Jun. 8, 2004

(54) REPEATER SYSTEM HAVING OSCILLATION PREVENTING FUNCTION AND AUTOMATIC REVERSE OUTPUT DISABLING FUNCTION FOR NON-SUBSCRIBER AND CONTROL METHOD THEREOF

(75) Inventors: Young-Min Oh, Anyang (KR); Byoung-Shik Kang, Yongin (KR); Hyung-Sik Cho, Sungnam (KR); Wan Choi, Seoul (KR)

(73) Assignee: Korea Telecom M.Com Co., Ltd., Seoul (KR)

( * ) Notice: Subject to any disclaimer, the term of this patent is extended or adjusted under 35 U.S.C. 154(b) by 442 days.

(21) Appl. No.: 09/794,049

(22) Filed: Feb. 28, 2001

(65) Prior Publication Data

US 2002/0119749 A1 Aug. 29, 2002

(51) Int. Cl.[7] .................................................. H04B 7/15
(52) U.S. Cl. ...................... 455/11.1; 455/24; 455/13.1; 455/126
(58) Field of Search .......................... 455/14, 11.1, 13.1, 455/7, 16, 24, 237.1, 245.1, 10, 13.4, 18, 9, 445, 20, 426.1, 15, 522, 517, 127.5, 126

(56) References Cited

U.S. PATENT DOCUMENTS 5,634,191 A * 5/1997 Beasley .......................... 455/14
5,815,795 A * 9/1998 Iwai ............................. 455/11.1
6,088,592 A * 7/2000 Doner et al. ................. 455/11.1
6,404,775 B1 * 6/2002 Leslie et al. ..................... 455/7
2002/0103001 A1 * 8/2002 Weissman ..................... 455/524

FOREIGN PATENT DOCUMENTS

EP       0 851 606 A2    7/1998
JP       10-313271       11/1998

* cited by examiner

Primary Examiner—Nay Maung
Assistant Examiner—John J Lee
(74) Attorney, Agent, or Firm—Finnegan, Henderson, Farabow, Garrett & Dunner LLP (57) ABSTRACT

Disclosed is a repeater system having an oscillation preventing function and an automatic reverse output disabling function, and a control method thereof, in which the reverse output of the repeater system is disabled upon detection of a non-subscriber interval in the service area or a reverse oscillation so as to prevent a drop in the capacity of a base station transceiver system and protect a reception path. The repeater system includes: a first duplexer coupled to an external base station transceiver system; a transmitter for amplifying a signal received from the first duplexer into a service frequency; a second duplexer for transmitting the output signal of the transmitter to a mobile station located in a corresponding service area in a wireless manner, and receiving a signal from the mobile station; a receiver for amplifying the signal received from the second duplexer; and a controller, coupled to the output signal of the receiver, for detecting the power level of the receiver, the controller preventing the output of the receiver being sent to the first duplexer when the detected power level is above a first reference value during a first time period or below a second reference value during a second time period.

6 Claims, 6 Drawing Sheets

REPEATER SYSTEM HAVING OSCILLATION PREVENTING FUNCTION AND AUTOMATIC REVERSE OUTPUT DISABLING FUNCTION FOR NON-SUBSCRIBER AND CONTROL METHOD THEREOF

BACKGROUND OF THE INVENTION (a) Field of the Invention

The present invention relates to a repeater system having an oscillation preventing function and a control method thereof. More specifically, the present invention relates to a repeater system interlocked with a base station transceiver system of a mobile communication system, and a control method thereof.

(b) Description of the Related Art

In general, a mobile communication system includes a base station transceiver system, a base station controller, a mobile switching center, and a mobile station.

The base station transceiver system is in communications with mobile stations in a predetermined frequency band, each mobile station having a predetermined service radius. Thus, a plurality of base station transceiver systems are properly arranged so that the service radii of the individual base station transceiver systems are overlapped, in order to extend the service area.

Although multiple base station transceiver systems cover the entire city area, there are still blanket areas, i.e., non-service areas, including underground areas of a large building, interior space of a high-rise building.

Mobile telephone subscribers can hardly have a smooth talking service in the blanket areas. Conventionally, repeater systems are installed in the blanket areas in an attempt to solve the problem in regard to the blanket areas with less expense relative to the base station transceiver systems.

Typically, several or several scores of repeater systems are connected in common to a single base station transceiver system, and the amount of noise introduced in the base station transceiver system on the reverse link increases in proportion to a rise in the number of the repeater systems connected to the base station transceiver system, thus reducing the capacity of the base station transceiver system.

The repeater systems may have self-oscillations depending on the installation place or according to circumstances. Among the self-oscillations, the forward oscillation causes no more than a failure of connection to the corresponding service area, but the reverse oscillation results in serious defects in a reception path of the base station transceiver system connected to the repeater systems.

SUMMARY OF THE INVENTION

It is an object of the present invention to solve the problem and to provide a repeater system having an oscillation preventing function and an automatic reverse output disabling function, and a control method thereof, in which the reverse output of the repeater system is disabled upon detection of a non-subscriber interval in the service area or a reverse oscillation so as to prevent a drop in the capacity of a base station transceiver system and protect a reception path.

In one aspect of the present invention, there is provided a repeater system comprising: a transmitter for amplifying data received from an external base station transceiver system, converting the amplified data to a service frequency, and sending the service frequency to a mobile station in a corresponding service area; a receiver for amplifying the signal received from the mobile station and outputting the amplified signal to the base station transceiver system; and a controller for detecting the power level of the receiver, and preventing the output signal of the receiver being sent to the base station transceiver system when the power level is above a first reference value during a first time or below a second reference value during a second time.

In another aspect of the present invention, there is provided a method for controlling a repeater system, comprising the steps of: discriminating between an oscillation signal of the repeater system, and a talking signal and an access signal, disabling a reverse output of the repeater system during oscillation of the repeater system, and after an elapse of a first time, detecting the state of power of the reverse output; disabling the reverse output of the repeater system when the power is in an oscillation state; and enabling the reverse output of the repeater system when the power not in the oscillation state and the reverse output is an access or talking signal.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. Expediently, the description will be given as to, for example, a personal communication service (PCS) system.

Figure 1:
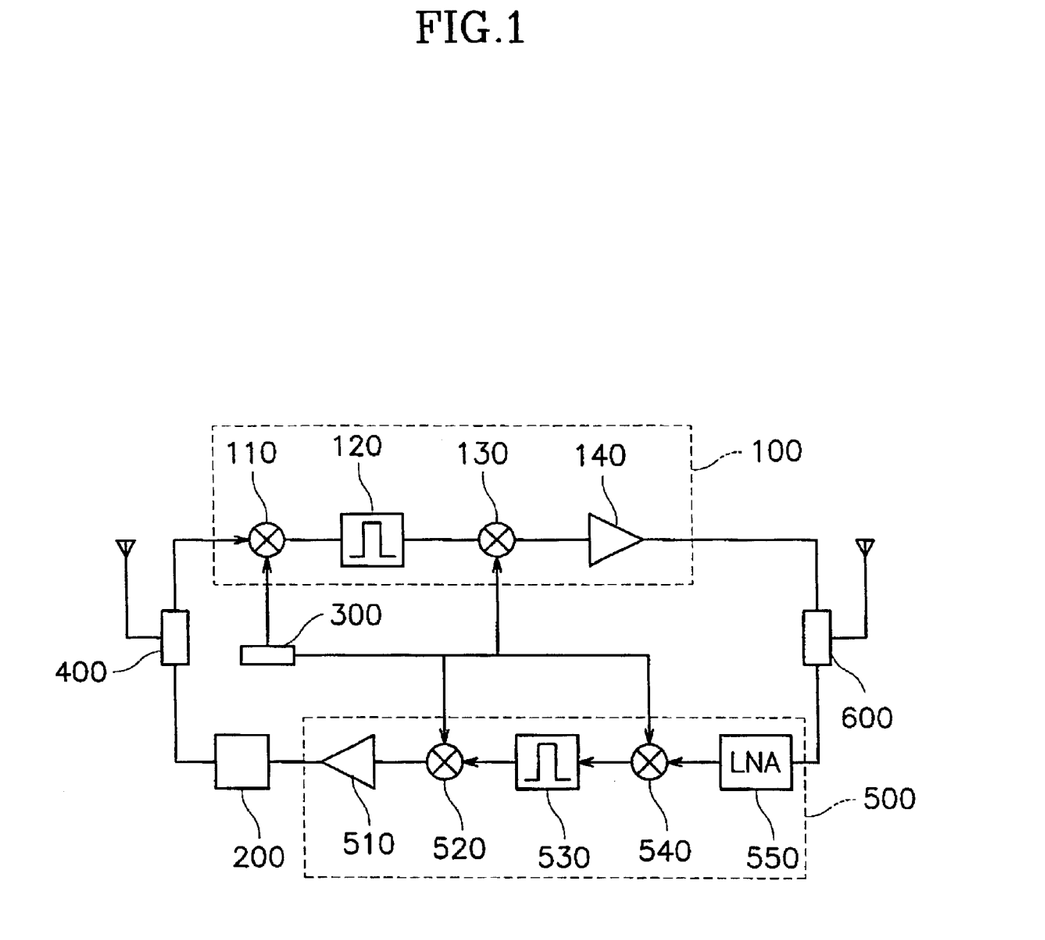
FIG. 1 is a schematic block diagram of a repeater system in accordance with an embodiment of the present invention.

FIG. 1 is a schematic block diagram of a repeater system in accordance with an embodiment of the present invention.

Referring to FIG. 1, the repeater system according to an embodiment of the present invention includes: a first duplexer 400 for transmitting data from an external base station transceiver system on a corresponding path; a transmitter 100 for amplifying a signal received from the first duplexer 400 into a service frequency; a second duplexer 600 for transmitting the output signal of the transmitter 100 to a mobile station located in a corresponding service area in a wireless manner, and receiving a signal from the mobile station; a receiver 500 for amplifying the signal received from the second duplexer 600; and a controller 200 coupled to the output signal of the receiver 500 for detecting the power level of the receiver 500, the controller 200 preventing the output of the receiver 500 being sent to the first duplexer 400 when the detected power level is above a first reference value during a first time period or below a second reference value during a second time period.

Figure 2:
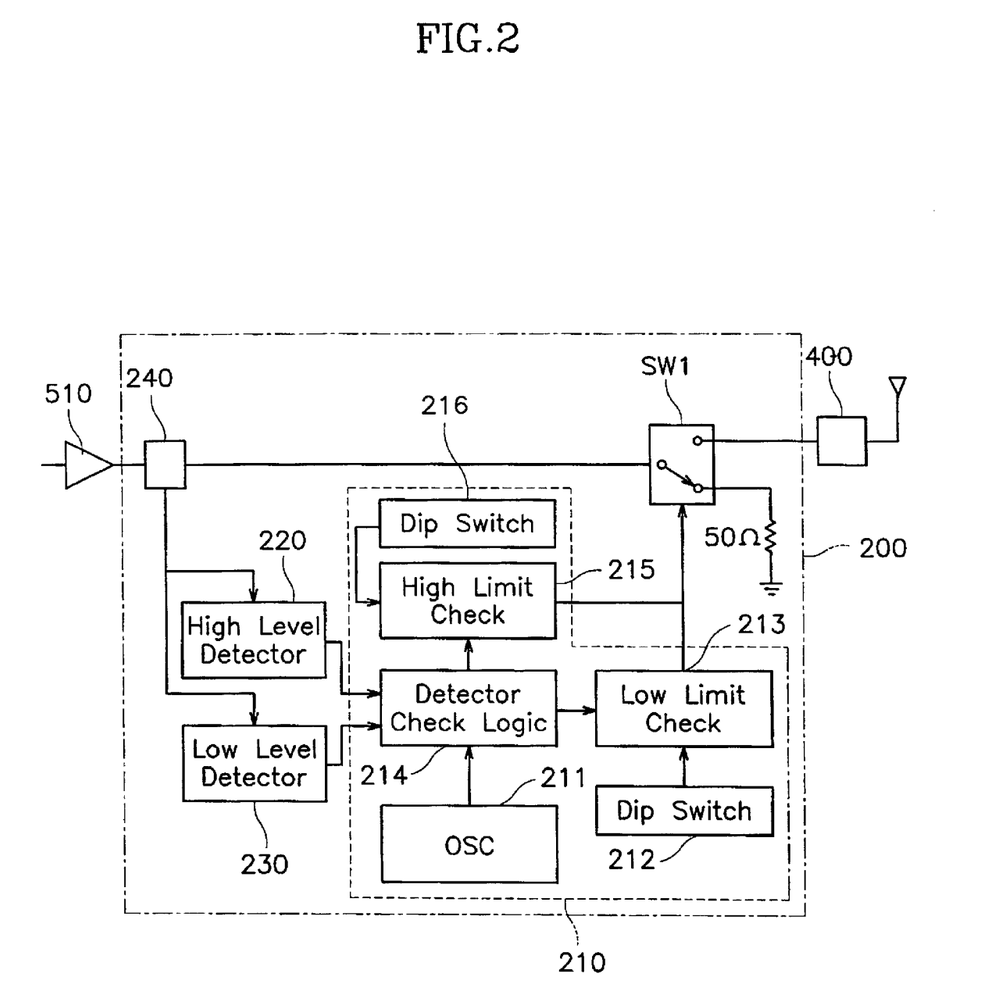
FIG. 2 is a detailed diagram of the controller shown in FIG. 1.

FIG. 2 is a detailed diagram of the controller 200 shown in FIG. 1.

Referring to FIG. 2, the controller 200 includes: a high level detector 220 coupled to the output of the receiver 500 for detecting a high power level of the receiver 500; a low level detector 230 coupled to the output of the receiver 500 for detecting a low power level of the receiver 500; an integrated circuit 210 for generating a control signal to prevent the output of the receiver 500 being sent to the first duplexer when the power level detected by the high level detector 220 is above the first reference value during the first time period, or when the power level detected by the low level detector 230 is below the second reference value during the second time period; and a switch SW1 for enabling or disabling transmission of the output signal of the receiver 500 to the first duplexer 400 based on the control signal of the integrated circuit 210.

The transmitter 100 includes: a first mixer 110 for converting a signal having a high frequency received from the first duplexer 400 to a signal having an intermediate frequency; a first surface acoustic wave (SAW) filter 120 for filtering the output signal of the first mixer 110 and outputting a desired signal having an intermediate frequency; a second mixer 130 for modulating the output signal of the first SAW filter 120 to a signal having a high frequency; and a first power amplifier 140 for amplifying the output signal of the second mixer 130 and outputting the amplified signal to the second duplexer 600.

The receiver 500 includes: a low-noise amplifier 550 for amplifying the signal having a high frequency received from the second duplexer 600; a third mixer 540 for modulating the output signal of the low-noise amplifier 550 into a signal having an intermediate frequency; a second SAW filter 530 for filtering the output signal of the third mixer 540 and outputting a desired signal having a high frequency; a fourth mixer 520 for modulating the output signal of the second SAW filter 530 into a signal having a high frequency; and a second power amplifier 510 for amplifying the output signal of the fourth mixer 520.

Now, a description will be given in detail as to an operation of the above-constructed repeater system in accordance with the present invention.

First, the first duplexer 400 receives an input radio signal having a high frequency of 1.8 to 1.9 MHz from a base station transceiver system. The input signal may be received at the first duplexer 400 via a wire depending on the repeater system.

The first mixer 110 converts the signal having a high frequency from the duplexer 400 to a signal having an intermediate frequency, and simultaneously, receives a signal having a frequency for intermediate frequency modulation from an oscillator 300.

The first SAW filter 120 filters the output of the first mixer 110 and outputs a signal having an intermediate frequency.

Subsequently, the second mixer 130 modulates the output signal of the first SAW filter 120 into a signal having a high frequency, and simultaneously, receives a signal having a frequency for high frequency modulation from the oscillator 300.

The first power amplifier 140 amplifies the output signal of the second mixer 130 and outputs the amplified signal to the second duplexer 600.

The second duplexer 600 sends this signal to the mobile telephone of the subscriber via an antenna. Then, the subscriber in the corresponding service area receives the signal.

The signal output from the mobile telephone of the subscriber is input to the second duplexer 600, amplified at the low-noise amplifier 550 and converted to a signal having an intermediate frequency at the third mixer 540.

The second SAW filter 530 filters the output signal of the third mixer 540 and outputs a signal having an intermediate frequency.

The fourth mixer 520 modulates the output signal of the second SAW filter 530 into a signal having a high frequency.

The signal having a high frequency is amplified at the second power amplifier 510 and sent to the base station transceiver system via the controller 200 and the first duplexer 400 in a wireless manner.

The mobile telephone gets in connection to the base station transceiver system in the above-described procedure.

If the subscriber is not located in the corresponding service area during the procedure, the second power amplifier 510 has a very low power and the power oscillates, in which case the controller 200 interrupts the output signal of the second power amplifier 510 on the reverse channel, i.e., to the first duplexer 400. The subscriber can adjust a voltage corresponding to the high and low limits using switches 212 and 216, and enables/disables both an oscillation preventing function and an automatic reverse output disabling function for non-subscriber intervals when no subscriber exists in the corresponding service area.

Now, a detailed description will be given as to an operation of the controller 200 with reference to FIGS. 3 and 4.

Figure 3:
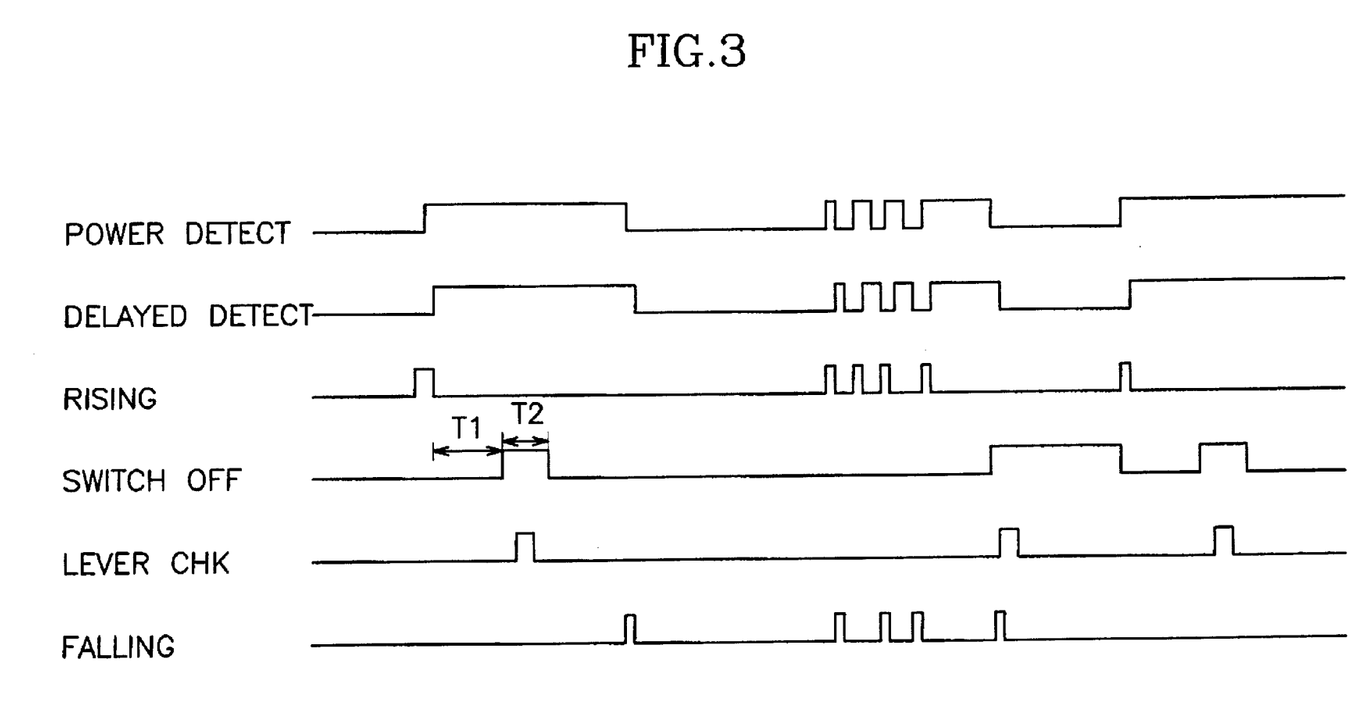
FIG. 3 is a timing diagram showing a logic flow in a high limit check circuit of the controller.

FIG. 3 is a timing diagram showing a logic flow in the controller 300.

First, the high level detector 220 of the controller 200 detects a high level component from the output of the second power amplifier 510 via a coupler 240, i.e., a highest access signal of the subscriber or an oscillation power level. The high level detector 220 detects the reverse access signal of the subscriber, a talking signal and an oscillation signal. If the detected level is above a predetermined reference value, i.e., in case of high-level detect, very high access signal or oscillation, the high level detector 220 generates a high-level power detect signal and a delayed detect signal DELAYED DETECT having the same power level as the power level detect signal. If the power detect signal POWER DETECT is 'high' and the delayed detect signal DELAYED DETECT is 'low', the high level detector 220 generates a rising signal RISING; and otherwise, the high level detector 220 generates a falling signal FALLING. The rising and falling signals RISING and FALLING are event triggers.

The high limit check circuit 215 of the detector check logic circuit 210 turns off the switch SW1 immediately after a predetermined time T1 from generation of the rising signal, and checks the level of the power detect signal POWER DETECT for a predetermined time T2 when the switch SW1 is off. If the power detect signal POWER DETECT has a high level detected during the time T2, the high limit check circuit 215 turns on the switch SW1. Otherwise, if the power detect signal POWER DETECT has a low level detected during the time T2, the switch SW1 is turned off. In a case where a failing signal FALLING is generated prior to the time T1 from generation of the rising signal RISING, the rising signal RISING is generated again and the switch SW1 is not turned off until the time T1. This is because the talking signal is continuously 'high' and hardly detected due to characteristic of the CDMA, with the oscillation signal continuously in a 'high' state. When the subscriber has an access with the switch SW1 off due to oscillation, the switch SW1 is turned on again. If the oscillation signal is detected repeatedly in this case, the system is completely down (in order to protect the base station transceiver system because repeated oscillation implies something wrong, in which case the switch SW1 is not ON even if the subscriber has access to). With the high level signal detected, it is possible to discriminate oscillation signal, terminal access signal and terminal talking signal.

This procedure may be implemented in a software manner. FIG. 4 is a flowchart explaining an operation for programming the procedure.

Figure 4:
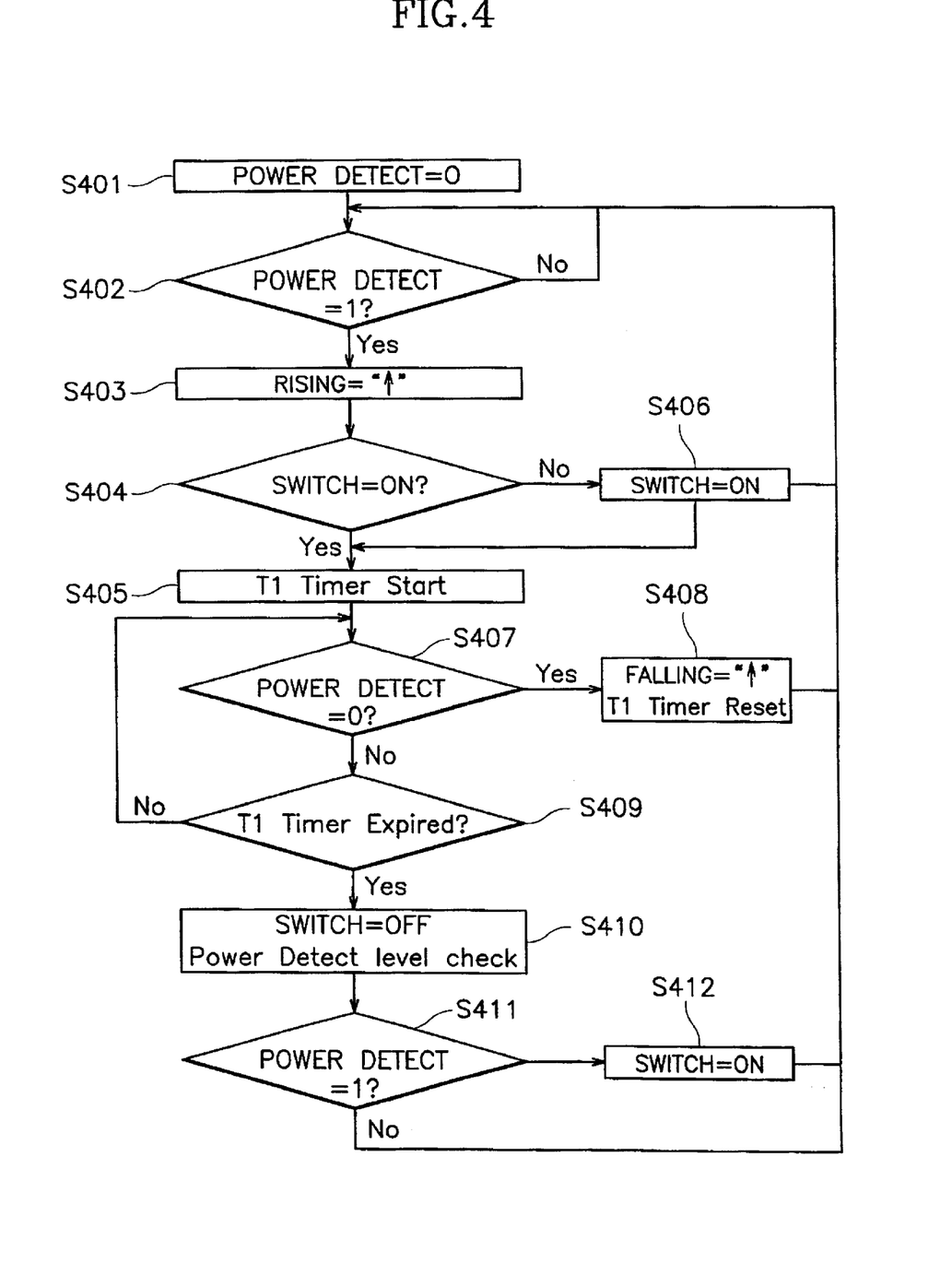
FIG. 4 is a flow chart for programming the high limit logic.

As shown in FIG. 4, the high limit check circuit 215 determines in step 402 whether the power detect signal S1 is converted from low level "0" (in step 401) to high level "1".

The high limit check circuit 215 generates a rising signal RISING and determines in step 404 whether the switch SW1 is ON. If the switch SW1 is OFF, the high limit check circuit 215 turns the switch SW1 on and activates the timer during a predetermined time T1, in step 405.

The high limit check circuit 215 determines in step 407 whether the power detect signal POWER DETECT is "0" after generation of the rising signal RISING, and if the power detect signal is "0", generates a falling signal RISING and resets the timer T1, in step 408.

When the timer T1 expires under the power detect signal POWER DETECT not being "0" after generation of the rising signal RISING, the high limit check circuit 215 turns the switch SW1 off and checks the level of the power detect signal POWER DETECT during a predetermined time T2 with the switch SW1 OFF, in step 410.

In other words, if the power detect signal POWER DETECT is at high level during the predetermined time T2, which implies non-oscillation, the high limit check circuit 215 turns the switch SW1 on, in step 412.

Otherwise, if the power detect signal POWER DETECT is at low level during the predetermined time T2, which implies oscillation, then the high limit check circuit 215 turns the switch SW1 off.

Now, a detailed description will be given as to an operation of the low limit check circuit 213 of the controller 200 with reference to FIGS. 5 and 6.

Figure 5:
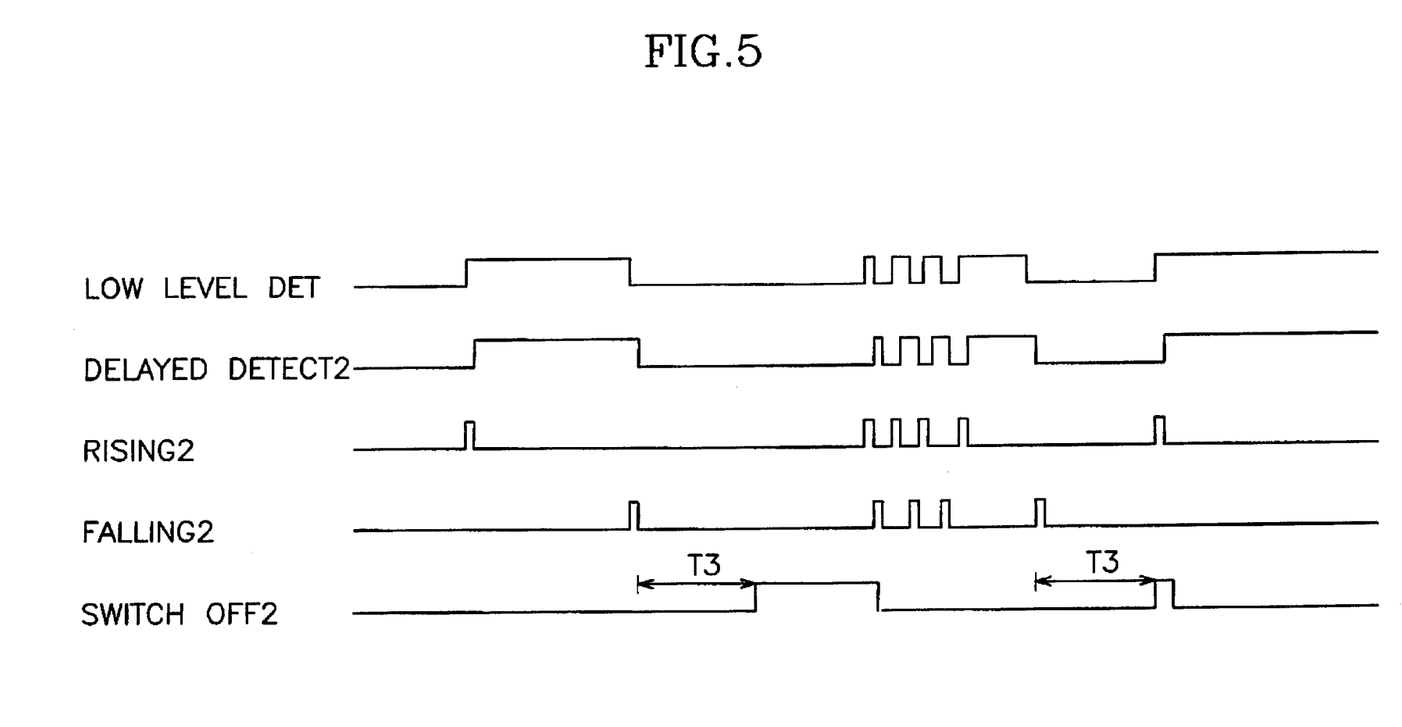
FIG. 5 is a timing diagram showing a logic flow in a low limit check circuit of the controller.

FIG. 5 is a timing diagram showing a logic flow in the low limit check circuit 213 of the controller 300.

First, the low level detector 230 of the controller 200 detects a low level component from the output of the second power amplifier 510 via the coupler 240, i.e., when no subscriber is connected. The output of the repeater system has an output level without an input signal, i.e., the output level=KTB+gain of the repeater system+noise factor of the repeater system. The low level detector 230 detects the reverse access signal of the subscriber, a talking signal and a non-signal output level. If the detected level is below a predetermined reference value, which implies that there is the non-signal output level without a reverse access signal of the subscriber nor a talking signal, the low level detector 230 turns the reverse output off to protect the reverse channel of the base station transceiver system. For this purpose, the low level detector 230 compares the detect signal being above a predetermine value to a delayed detect signal delayed detect2 to generate a rising signal RISING2 and a falling signal FALLING2, and after an elapse of a predetermined time T3 from generation of the falling signal FALLING2, turns the switch SW1 off.

Under the rising signal RISING2, the low level detector 230 turns the switch SW1 on. As such, the reverse output of the repeater system is disabled without a subscriber connection, so that reduction of the reverse capacity of the base station transceiver system due to the repeater system can be improved.

This procedure may be implemented in an either software or hardware manner. FIG. 6 is a flowchart explaining an operation for programming the procedure.

Figure 6:
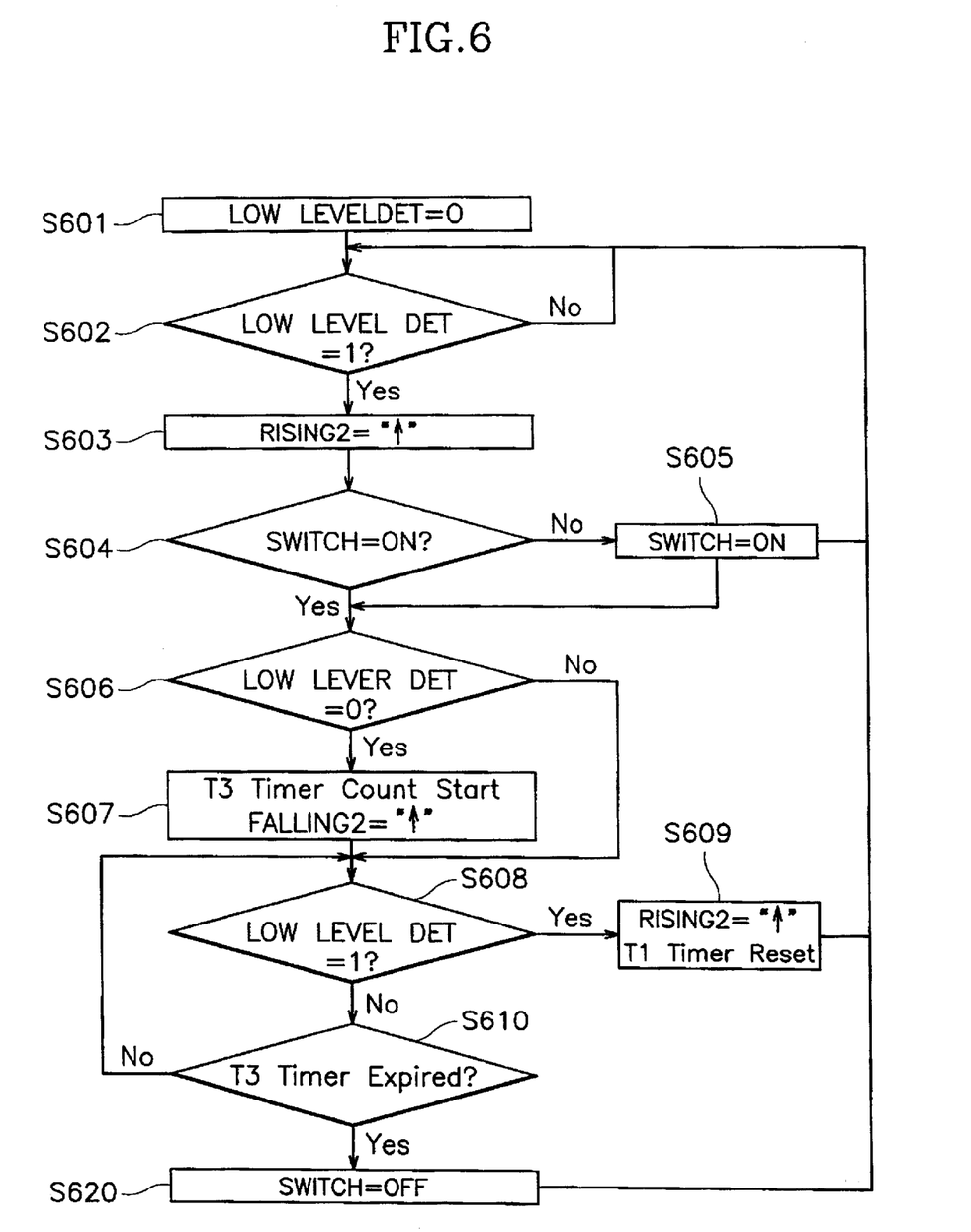
FIG. 6 is a flow chart for programming the low limit logic.

As shown in FIG. 6, the low limit check circuit 213 determines in step 602 whether the low level detect signal LOW LEVEL DETECT is converted from low level "0" (in step 601) to high level "1".

The low limit check circuit 213 generates a rising signal RISING2 and determines in step 604 whether the switch SW1 is ON. If the switch SW1 is OFF, the low limit check circuit 213 turns the switch SW1 on and determines in step 606 whether the low level detect signal LOW LEVEL DETECT is "0".

If the low level detect signal LOW LEVEL DETECT is "0", the low limit check circuit 213 generates a falling signal FALLING2 and activates a timer T3, in step 607.

The low limit check circuit 213 determines in step 608 whether the low level detect signal LOW LEVEL DETECT is "1" after generation of the falling signal FALLING2. If so, the low limit check circuit 213 generates a rising signal RISING2 and resets the timer, in step 609.

Otherwise, if the detect signal LOW LEVEL DETECT is not "1" after generation of the falling signal FALLING2 and the timer T3 expires in step 610, the low limit check circuit 213 turns the switch SW1 off immediately.

The present invention is not specifically limited to the PCS and may be applied to any general mobile communication system.

As described above, the embodiment of the present invention provides a repeater system and a control method thereof, in which the reverse output of the repeater system is disabled upon detection of a non-subscriber interval in the service area or a reverse oscillation so as to prevent a drop in the capacity of a base station transceiver system and protect a reception path.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A repeater system comprising:
   a transmitter for amplifying data received from an external base station transceiver system, converting the amplified data to a service frequency, and wirelessly sending the service frequency to a mobile station in a corresponding service area;
   a receiver for amplifying the signal received from the mobile station and outputting the amplified signal to the base station transceiver system; and
   a controller for detecting the power level of the receiver, and preventing the output signal of the receiver from being sent to the base station transceiver system when the power level is above a first reference value during a first time or below a second reference value during a second time.

2. The repeater system as claimed in claim 1, wherein the controller comprises:
   a high level detector, coupled to the output of the receiver, for detecting a high power level of the receiver;

a low level detector, coupled to the output of the receiver, for detecting a low power level of the receiver;

an integrated circuit for generating a control signal to preventing the output of the receiver from being sent to the base station transceiver system when the power level detected by the high level detector is above the first reference value during the first time, or when the power level detected by the low level detector is below the second reference value during the second time; and a switch for enabling or disabling transmission of the output signal of the receiver to the base station transceiver system based on the control signal of the integrated circuit.

3. The repeater system as claimed in claim 1, wherein the transmitter comprises:

a first mixer for modulating a high frequency signal received from the base station transceiver system into an intermediate frequency signal;

a first surface acoustic wave (SAW) filter for filtering the output signal of the first mixer and outputting a desired intermediate frequency signal;

a second mixer for modulating the output signal of the first SAW filter into a high frequency signal; and a first power amplifier for amplifying the output signal of the second mixer and outputting the amplified signal to the mobile station.

4. The repeater system as claimed in claim 1, wherein the receiver comprises:

a low-noise amplifier for amplifying a high frequency signal received from the mobile station;

a third mixer for modulating the output signal of the low-noise amplifier into an intermediate frequency signal;

a second SAW filter for filtering the output signal of the third mixer and outputting a desired high frequency signal;

a fourth mixer for modulating the output signal of the second SAW filter into a high frequency signal; and a second power amplifier for amplifying the output signal of the fourth mixer and outputting an amplified signal.

5. A method for controlling a repeater system, comprising the steps of:

discriminating an oscillation signal of the repeater system, a talking signal and an access signal, disabling a reverse output of the repeater system during oscillation of the repeater system, and after an elapse of a first time, detecting the state of power of the reverse output;

disabling the reverse output of the repeater system when the power is in an oscillation state; and enabling the reverse output of the repeater system when the power is not in the oscillation state and the reverse output is an access or talking signal.

6. The method as claimed in claim 5, further comprising the steps of:

determining whether the power has a minimum value when no subscriber exists during a predetermined time;

disabling the reverse output of the repeater system when the power maintains the minimum value; and maintaining the reverse output of the repeater system using the access signal of the subscriber when the subscriber attempts to connect while the reverse output of the repeater system is disabled.

* * * * *